(12) United States Patent
Hirose et al.

(10) Patent No.: US 10,879,517 B2
(45) Date of Patent: Dec. 29, 2020

(54) ELECTRICITY STORAGE APPARATUS

(71) Applicant: KABUSHIKI KAISHA TOYOTA JIDOSHOKKI, Kariya (JP)

(72) Inventors: Takayuki Hirose, Kariya (JP); Mikiya Kurita, Kariya (JP); Ryuji Oide, Kariya (JP); Masato Ogasawara, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 15/777,735

(22) PCT Filed: Nov. 14, 2016

(86) PCT No.: PCT/JP2016/083664
§ 371 (c)(1),
(2) Date: May 21, 2018

(87) PCT Pub. No.: WO2017/090472
PCT Pub. Date: Jun. 1, 2017

(65) Prior Publication Data
US 2018/0337389 A1    Nov. 22, 2018

(30) Foreign Application Priority Data

Nov. 27, 2015 (JP) ................................. 2015-232389

(51) Int. Cl.
*H01M 2/26* (2006.01)
*H01M 2/22* (2006.01)

(52) U.S. Cl.
CPC ............... *H01M 2/26* (2013.01); *H01M 2/22* (2013.01)

(58) Field of Classification Search
CPC .................................. H01M 2/22; H01M 2/26
See application file for complete search history.

(56) References Cited

U.S. PATENT DOCUMENTS 9,711,768 B2    7/2017  Mune et al.
2016/0197335 A1*  7/2016  Kim ..................... H01M 2/30
429/179

FOREIGN PATENT DOCUMENTS

CN     201562719 U    8/2010
JP     2003-68273 A    3/2003
(Continued)

OTHER PUBLICATIONS

Translation of International Preliminary Report on Patentability, issued by the International Bureau in International Application No. PCT/JP2016/083664.
(Continued)

*Primary Examiner* — Victoria H Lynch
(74) *Attorney, Agent, or Firm* — Sughrue Mion, PLLC (57) ABSTRACT

An electricity storage apparatus 100 may include: an electrode assembly 3 including a positive electrode and a negative electrode; a tab 9 including one end which is electrically connected to the electrode assembly 3; and a conductive member 20 disposed above the electrode assembly 3, and electrically connected to the tab 9. The tab 9 may include a first bent part 14 provided in a vicinity of the one end of the tab 9, a second bent part 16 provided in a vicinity of another end of the tab 9, and a joining part 18 provided between the first bent part 14 and the second bent part 16 and joined to the conductive member 20. The second bent part 16 may be bent so that the other end of the tab 9 is disposed above the conductive member 20.

8 Claims, 8 Drawing Sheets

(56) References Cited

FOREIGN PATENT DOCUMENTS

| JP | 2013-161757 A | 8/2013 |
|---|---|---|
| WO | 2014/084088 A1 | 6/2014 |

OTHER PUBLICATIONS

International Search Report for PCT/JP2016/083664 dated Jan. 31, 2017 [PCT/ISA/210].
International Preliminary Examination Report for PCT/JP2016/083664 dated Aug. 30, 2017 [PCT/IPEA/409].

* cited by examiner

ELECTRICITY STORAGE APPARATUS

CROSS REFERENCE TO RELATED APPLICATIONS

This application is a National Stage of International Application No. PCT/JP2016/083664, filed on Nov. 14, 2016, which claims priority from Japanese Patent Application No. 2015-232389, filed on Nov. 27, 2015.

TECHNICAL FIELD

The technique disclosed herein relates to an electricity storage apparatus.

BACKGROUND

In an electricity storage apparatus, an electrode assembly housed in a casing is electrically connected to one end of a conductive member via a tab, and the other end of the conductive member is electrically connected to an electrode terminal provided in the casing. Since the electrode assembly, the tab, and the conductive member are housed in the casing, if any of these members contacts the casing at an unintentional position, a positive electrode and a negative electrode of the electrode assembly may be short-circuited. For this reason, a technique for suppressing a risk of a short-circuit in an electricity storage apparatus is being developed. For example, in a sealed battery described in Japanese Patent Application Publication No. 2003-68273, a tab is bent into a space between a battery element (so-called electrode assembly) and a lid of a casing, and an insulating member is provided between a bent part of the tab and a side wall of the casing. The insulating member prevents a contact and a short-circuit between the tab and the side wall of the casing.

SUMMARY

An end of the tab of the sealed battery in Japanese Patent Application Publication No. 2003-68273 is positioned below an electrode leading pin (an example of the conductive member). That is, the end of the tab is positioned between the batter element and the electrode leading pin. Since the insulating member is not disposed between the electrode element and the end of the tab, the electrode element and the end of the tab may be brought into contact and short-circuited. The present teachings disclose an electricity storage apparatus that suppresses a risk of a short-circuit between an electrode assembly and a tab due to a contact therebetween.

A first electricity storage apparatus disclosed herein may comprise: an electrode assembly including a positive electrode and a negative electrode; a tab including one end which is electrically connected to the electrode assembly; and a conductive member disposed above the electrode assembly, and electrically connected to the tab. The tab may comprise a first bent part provided in a vicinity of the one end of the tab, a second bent part provided in a vicinity of another end of the tab, and a joining part provided between the first bent part and the second bent part, and the joining part may be joined to the conductive member. The second bent part may be bent so that the other end of the tab is disposed above the conductive member.

In the above-described electricity storage apparatus, a tab is bent such that a distal end of the tab is positioned above the conductive member. Due to this, the conductive member is positioned between the distal end of the tab and the electrode assembly, and even when the distal end of the tab is displaced downward, a contact between the other end of the tab and the electrode assembly can be avoided. Due to this, a risk of a short-circuit of the electricity storage apparatus can be suppressed.

A second electricity storage apparatus disclosed herein may comprise: an electrode assembly including a positive electrode and a negative electrode; a tab including one end which is electrically connected to the electrode assembly; and a conductive member disposed above the electrode assembly, and electrically connected to the tab. The tab may comprise: a first bent part provided on a side close to the one end of the tab, a second bent part provided on a side close to another end of the tab, and a joining part provided between the first bent part and the second bent part, the joining part joined to the conductive member. The joining part may extend along a surface of the conductive member, and the second bent part may be bent upward from a direction in which the joining part extends.

In this electricity storage apparatus as well, since the second bent part disposed in a vicinity of the other end of the tab is bent upward, a contact between the end of the tab and the electrode assembly can be avoided. Due to this, a risk of a short-circuit of the electricity storage apparatus can be avoided.

DETAILED DESCRIPTION

Some of main features of embodiments will be described hereinbelow. Technical elements described hereinbelow are independent technical elements, respectively, and they can exert usefulness solely or in any combination thereof, are not limited to combination disclosed in claims originally filed.

(Feature 1) in the electricity storage apparatus disclosed herein, the conductive member may be positioned below the joining part of the tab. According to this configuration, the second bent part may be disposed above the conductive member, and thus the distal end of the tab can be suitably disposed above the conductive member. Due to this, a possibility of a contact between the distal end of the tab and the electrode assembly can further be avoided.

(Feature 2) in the electricity storage apparatus disclosed herein, the conductive member may comprise a curved surface shape part following a surface shape of at last a specific part of the first bent part. The curved surface shape part may be in contact with the tab at least in the specific part of the first bent part. According to this configuration, a contact area between the conductive member and the tab becomes large, and a resistance can be suitably decreased.

First Embodiment

Figure 1:
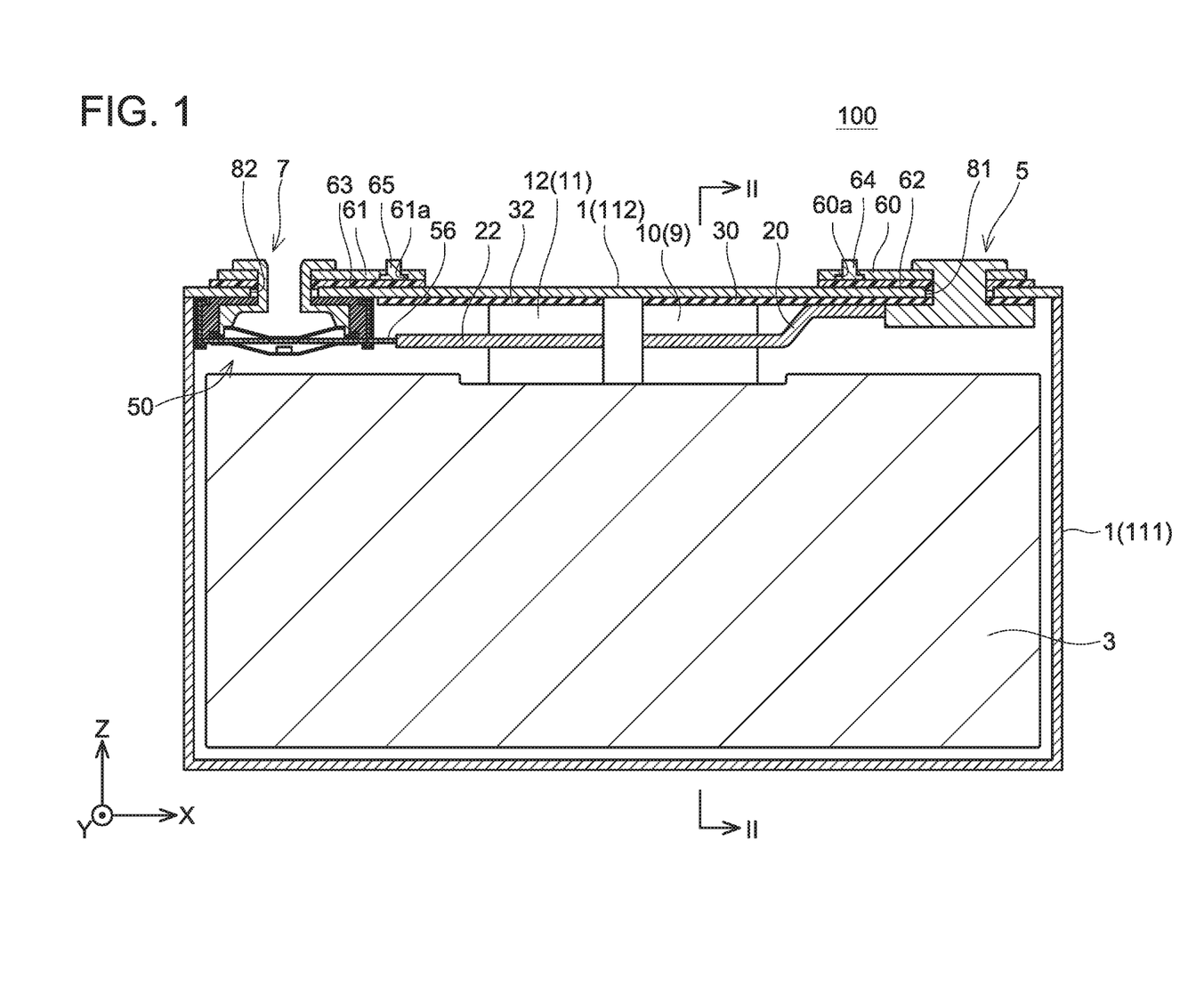
FIG. 1 is a cross sectional view of an electricity storage apparatus according to a first embodiment.

An electricity storage apparatus 100 of an embodiment will be hereinafter described with reference to drawings. As shown in FIG. 1, the electricity storage apparatus 100 comprises a casing 1, an electrode assembly 3 housed in the casing 1, and connecting terminals 5 and 7 which function as electrode terminals fixed to the casing 1. The electrode assembly 3 is electrically connected each of the connecting terminals 5, 7. Further, the electricity storage apparatus 100 also comprises a current interruption device 50 which is disposed between the electrode assembly 3 and the connecting terminal 7. An electrolyte is contained in the casing 1, and the electrode assembly 3 is immersed in the electrolyte.

The casing 1 is constituted of metal, and is a substantially rectangular-shaped box member. The casing 1 comprises a body 111 and a lid 112 fixed to the body 111. The lid 112 covers an upper portion of the body 111. Fitting holes 81, 82 are provided in the lid 112. The connecting terminal 5 extends from inside to outside the casing 1 through the fitting hole 81, and the connecting terminal 7 extends from inside to outside the casing 1 through the fitting hole 82. Further, a safety valve and an electrolyte injection port which are not shown, are provided in the lid 112. The safety valve is made more fragile than the other part of the lid 112 such that the safety valve is ruptured when a pressure in the casing 1 increased. That is, when the pressure in the casing 1 is increased, the safety valve ruptures and gas and the like in the casing 1 is discharged outside of the casing 1. Further, the electrolyte injection port is provided for injecting the electrolyte into the casing 1, and the electrolyte injection port is sealed after the electrolyte is injected into the casing 1.

The electrode assembly 3 comprises positive electrodes, negative electrodes and separators disposed between the positive electrodes and the negative electrodes, respectively. The electrode assembly 3 is constituted by laminating a plurality of laminates, each of which comprises the positive electrode, the negative electrode and the separator. Each of the positive electrodes and the negative electrodes comprises a collector and an active material layer provided on the collector. Examples of materials for the positive electrode include aluminum foil, and examples of materials for the negative electrode include copper foil. Further, the electrode assembly 3 comprises a positive electrode tab 9 provided in each positive electrode, and a negative tab 11 provided in each negative electrode.

Each positive electrode tab 9 is provided at an upper end portion of the positive electrode. Each negative electrode tab 11 is provided at an upper end portion of the negative electrode. The positive electrode tabs 9 and the negative electrode tabs 11 protrude upward of the electrode assembly 3. A plurality of the positive electrode tabs 9 is bundled and fixed to the conductive member 20. A plurality of the negative electrode tabs 11 is bundled and fixed to the conductive member 22. The bundle of the plurality of the positive electrode tabs 9 will be hereinafter termed a positive electrode tab group 10, and the bundle of the plurality of the negative electrode tabs 11 will be hereinafter termed a negative electrode tab group 12. Configurations of the positive electrode tab group 10 and the negative electrode tab group 12 will be described later. An insulating member 30 is disposed between the positive electrode tab group 10 and the casing 1. An insulating member 32 is disposed between the negative electrode tab group 12 and the casing 1. The insulating member 30 insulates the positive electrode tab group 10 from the lid 112 of the casing 1. The insulating member 32 insulates the negative electrode tab group 12 from the lid 112 of the casing 1. It should be noted that in the electricity storage apparatus 100, a side of the connecting terminals 5, 7 is termed "upper direction" (upper side of a Z direction).

The conductive member 20 is connected to the positive electrode tab group 10 and the connecting terminal 5. The positive electrode tab group 10 is electrically connected to the connecting terminal 5 via the conductive member 20. The conductive member 22 is connected to the negative electrode tab group 12 and the connecting terminal 56. The connecting terminal 56 is electrically connected to the connecting terminal 7 via the current interruption device 50. Thus, the negative electrode tab group 12 and the connecting terminal 7 are electrically connected via the conductive member 22, connecting terminal 56 and the current interruption device 50. Due to this, a current path connecting the electrode assembly 3 and the connecting terminal 7 is formed. The current interruption device 50 is a pressure sensitive type current interruption device, and is capable of cutting off the current path connecting the negative electrode tab group 12 and the connecting terminal 7. When an inner pressure in the casing 1 exceeds a preset pressure due to overcharge or the like, the current interruption device 50 is operated to cut off the current path. Since the current interruption device 50 is same as a current interruption device used in the well-known electricity storage apparatus (e.g., a current interruption device described in Japanese Patent Application Publication No. 2015-167085), detailed description thereof will be omitted.

Resin gaskets 62, 63 are disposed at an upper surface of the lid 112. The gasket 62 is fixed to the connecting terminal 5. Further, a positive electrode external terminal 60 (metal plate) is disposed at an upper surface of the gasket 62. A through hole 60a is provided in the positive electrode external terminal 60. A size of the through hole 60a on its lower surface side is larger than that on its upper surface side. The gasket 62 insulates the lid 112 from the positive electrode external terminal 60. A bolt 64 penetrates the through hole 60a. Specifically, a head of the bolt 64 is housed in the through hole 60a. Further, a shank of the bolt 64 protrudes upward of the positive electrode external terminal 60 through the through hole 60a. The connecting terminal 5, the positive electrode external terminal 60, and the bolt 64 are electrically connected to each other, and constitutes the positive terminal. The gasket 63 is fixed to the connecting terminal 7. The negative electrode external terminal 61 is disposed at an upper surface of the gasket 63. A through hole 61a similar to the through hole 60a of the positive electrode external terminal 60 is provided in the negative electrode external terminal 61. A head of the bolt 65 is housed in the through hole 61a, and a shank of the bolt 65 protrudes upward of the negative electrode external terminal 61 through the through hole 61a. Configurations of the gasket 63, the negative electrode external terminal 61, and the bolt 65 are similar to those of the above-described gasket 62, the positive electrode external terminal 60, and the bolt 64. The connecting terminal 7, the negative electrode external terminal 61, and the bolt 65 are electrically connected to each other, and constitute the negative terminal.

Figure 2:
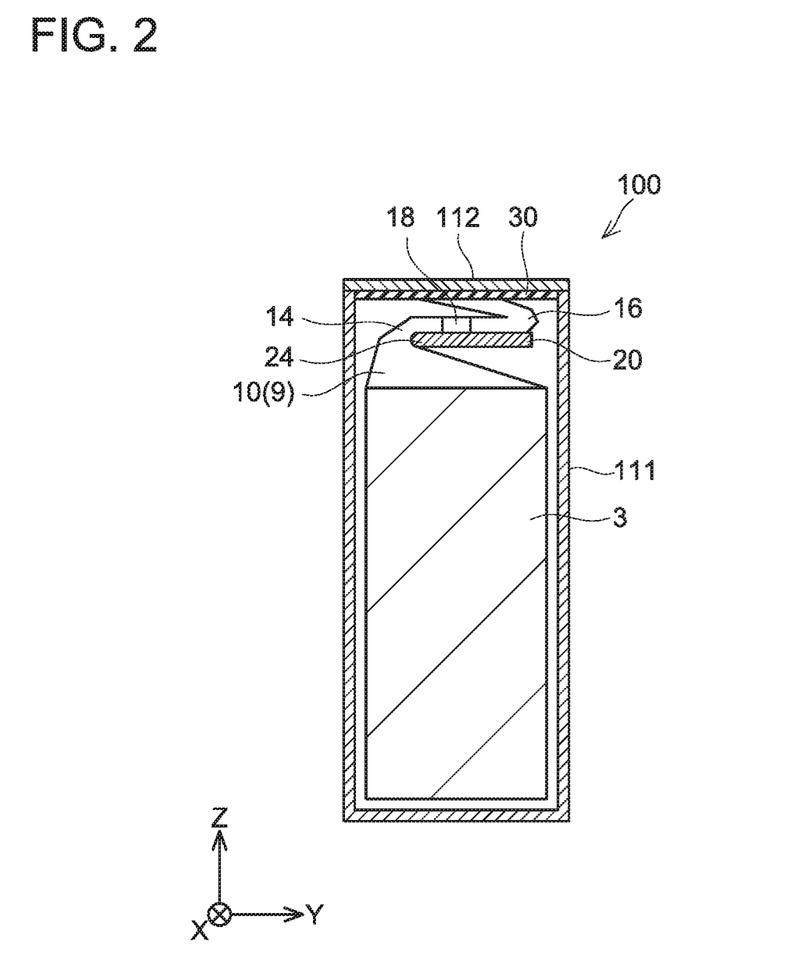
FIG. 2 is a cross sectional view along a line II-II of FIG. 1 (yz cross section).

A connecting structure of the positive electrode tab group 10 and the conductive member 20 will be described with reference to FIG. 2. The positive electrode tab group 10 protrudes upward from the upper surface of the electrode assembly 3. The positive electrode tab group 10 is electrically connected to the electrode assembly 3 (specifically, each positive electrode constituting the electrode assembly 3) at a lower end of the positive electrode tab group 10, and is electrically connected to the conductive member 20 near an upper end of the positive electrode tab group 10. The insulating member 30 is disposed between the upper end of the positive electrode tab group 10 and the lid 112 of the casing 1. Specifically, the insulating member 30 is fixed to a lower surface of the lid 112, and the upper end of the positive electrode tab group 10 is in contact with the lower surface of the insulating member 30. As shown in FIG. 2, the positive electrode tab group 10 comprises a first bent part 14, a second bent part 16 and a joining part 18.

The first bent part 14 is provided in a vicinity of a lower end of the positive electrode tab group 10. The first bent part 14 is formed by bending the positive electrode tab group 10, which extends upward (the z direction) from the electrode assembly 3, in the horizontal direction (y direction (+side)). That is, the positive electrode tab group 10 extends upward from the upper end of the electrode assembly 3, is bent at the first bent part 14 in the horizontal direction (the y direction (+side)), and extends along, an upper surface of the conductive member 20 in the horizontal direction (the y direction (+side)). A position in a height direction (the z direction) of the first bent part 14 is matched with a position in the height direction (the z direction) of the conductive member 20, and the first bent part 14 is in contact with the conductive member 20 on an inner peripheral side of the first bent part 14.

The second bent part 16 is provided in a vicinity of the upper end of the positive electrode tab group 10. That is, the first bent part 14 is disposed on a side close to an end of the positive electrode tab group 10 connected to the electrode assembly 3, and the second bent part 16 is disposed on a side close to a distal end of the positive electrode tab group 10. The second bent part 16 is formed by bending back the positive electrode tab group 10, which extends in the y direction (+side) from the first bent part 14, upward toward the lid 112, and further bending the positive electrode tab group 10 such that it extends in the y direction (−side). That is, the positive electrode tab group 10 extends in the horizontal direction from the first bent part 14, and is folded upward toward the lid 112 by being bent at the second bent part 16. The upper end of the positive electrode tab group 10 extends toward a lateral side (i.e., extends from the y direction (+side) to the y direction (−side)) between the lid 112 and the conductive member 20. A position of the second bent part 16 in the y direction is substantially matched with a position of the end of the conductive member 20 in the y direction (+side). Due to this, the positive electrode tab group 10 extends horizontally along the upper surface of the conductive member 20 from one end of the conductive member (end in the y direction (−side)) to the other end (end in the y direction (+side)). As aforementioned, the positive electrode tab group 10 is bent twice between the electrode assembly 3 and the insulating member 30, and the upper end of the positive electrode tab group 10 is disposed above the conductive member 20 and below the lid 112. By disposing the upper end of the positive electrode tab group 10 above the conductive member 20, even if the upper end of the positive electrode tab group 10 is displaced downward due to vibration or the like of the electricity storage apparatus 100, a contact between the upper end of the positive electrode tab group 10 and the electrode assembly 3 can be avoided. Due to this, a risk of a short-circuit of the electricity storage apparatus 100 can be suppressed suitably. It should be noted that since the insulating member 30 is disposed on the lower surface of the lid 112, the electricity storage apparatus 100 is not short-circuited due to a contact of the distal end of the positive electrode tab group 10 with the lid 112.

The joining part 18 is disposed between the first bent part 14 and the second bent part 16. That is, the joining part 18 is provided in a part where the positive electrode tab group 10 extends horizontally along the upper surface of the conductive member 20. As is apparent from FIG. 2, the lower surface of the positive electrode tab group 10 is in contact with the upper surface of the conductive member 20 between the first bent part 14 and the second bent part 16. The joining part 18 joins the positive electrode tab group 10 and the conductive member 20 between the first bent part 14 and the second bent part 16. A joining structure of the joining part 18 is not particularly limited as long as the positive electrode tab group 10 and the conductive member 20 are electrically connected, and for example, welding can be adopted. The joining part 18 may be disposed closer to the first bent part 14 than to the second bent part 16. By disposing the joining part 18 closer to the first bent part 14, the positive electrode tabs 9 are joined to the conductive member 20 at a position closer to the electrode assembly 3. Due to this, an electric resistance of the current path connecting the electrode assembly 3 and the connecting terminal 5 can be decreased.

The conductive member 20 is disposed between the joining part 18 and the electrode assembly 3. A curved surface shape part 24 is provided at one end (end in the y direction (−side)) of the conductive member 20 along a yz cross-section. The curved surface shape part 24 has a shape following a surface shape on the inner peripheral side of the first bent part 14. Specifically, in the yz cross-section of FIG. 2, in the curved surface shape part 24 of the conductive member 20, a corner connecting its upper surface and its lateral surface is processed into a rounded shape, and a corner connecting its lower surface and its lateral surface is processed into a rounded shape. Due to this, the positive electrode tab group 10 is in contact with the conductive member 20 in the curved surface shape part 24 of the conductive member 20, and they are electrically connected. That is, the positive electrode tabs 9 and the conductive member 20 are electrically connected at the joining part 18 as well as being electrically connected at the first bent part 14 due to the contact therebetween. Due to this, an area where the conductive member 20 and the positive electrode tabs 9 are electrically connected is made large, and an electric resistance therebetween is made small. Further, a contact portion between the curved surface shape part 24 of the conductive member 20 and the first bent part of the positive electrode tabs 9 is provided closer to the electrode assembly 3 than to the joining part 18. Due to this, since the positive electrode tabs 9 and the conductive member 20 are in contact with each other at a position closer to the electrode assembly 3, the electric resistance therebetween is suitably decreased. As is apparent from FIG. 2, the curved surface shape part is not provided at the other end. (end in the y direction (+side)) of the conductive member 20 in the yz cross-section. That is, a corner connecting its upper surface and its lateral surface is not processed into a rounded shape, and a corner connecting its lower surface and its lateral surface is not processed into a rounded shape. However, the curved surface shape part may be provided at the other end of the conductive member 20 in the yz cross-section (end of the y direction (+side)), as well.

The description with reference to FIG. 2 is given to the connecting structure of the positive electrode tab group 10 and the conductive member 20. However, the connecting structure of the negative electrode tab group 12 and the conductive member 22 has the same structure. That is, a positional relationship between the negative electrode tab group 12, the conductive member 22 and the insulating member 32, and shapes thereof are same as the configurations of the positive electrode tab group 10, the conductive member 20 and the insulating member 30. Due to this, an upper end of the negative electrode tab group 12 that extends from the electrode assembly 3 can be avoided from contacting the electrode assembly 3. Due to this, a risk of a short-circuit of the electricity storage apparatus 100 is suitably suppressed also in the negative electrode tab group 12. Further, in the above embodiment, the positive electrode tabs 9 and the negative electrode tabs 11 are provided at the respective ends of the electrode assembly 3. However, the positive electrode tabs 9 and the negative electrode tabs 11 may be provided separately from the electrode assembly 3.

Second Embodiment

In the above-described first embodiment, the conductive member 20 is disposed between the joining part 18 and the electrode assembly 3. However, a technique disclosed herein is not limited thereto. For example, a configuration of the electricity storage apparatus 102 shown in FIG. 3 may be adopted. The electricity storage apparatus 102 is a variant of the electricity storage apparatus 100 of the first embodiment, and it greatly differs from the electricity storage apparatus 100 in that a conductive member 20a is disposed between a joining part 18a and the lid 112. In the following description, same numbers are given to same components as those of the electricity storage apparatus 100, and description thereof may be omitted.

Figure 3:
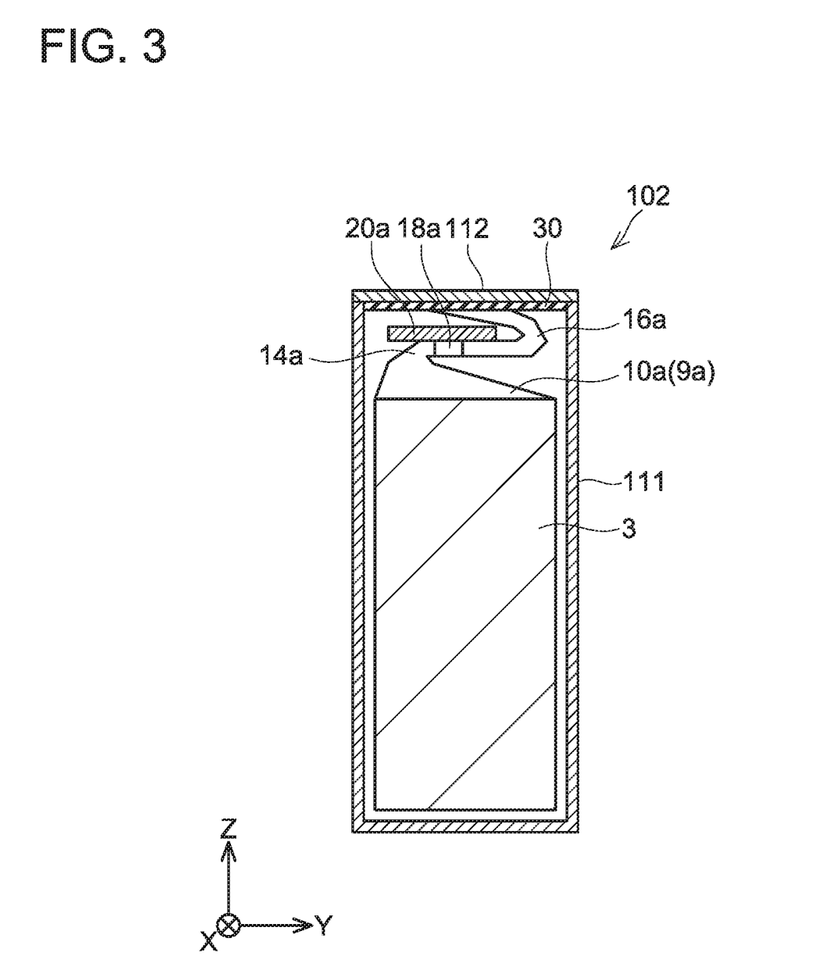
FIG. 3 is a cross sectional view showing a characteristic portion of an electricity storage apparatus according, to a second embodiment (the yz cross section).

In the electricity storage apparatus 102, the conductive member 20a is disposed above the joining part 18a of a positive electrode tab group 10a (a bundle of a plurality of positive electrodes 9a). That is, a first bent part 14a of the positive electrode tab group 10a is positioned below the conductive member 20a, the positive electrode tab group 10a extends horizontally along a lower surface of the conductive member 20a, and the upper surface of the positive electrode tab group 10a is in contact with the lower surface of the conductive member 20a. In the second bent part 16a of the positive electrode tab group 10a, the positive electrode tab group 10a is bent so as to come around a lateral surface of the conductive member 20a, and an upper end of the positive electrode tab group 10a extends toward the lid 112. The upper end of the positive electrode tab 10a extends toward the lateral side between the lid 112 and the conductive member 20 (e.g., extends from the y direction (+side) to the y direction (−side)). In the electricity storage apparatus 102 according to the present embodiment as well, the upper end of the positive electrode tab group 10a is disposed above the conductive member 20a and below the lid 112. Due to this, the upper end of the positive electrode tab 10a can be avoided from making contact with the electrode assembly 3, and a risk of a short-circuit of the electricity storage apparatus 102 can be suppressed. It should be noted that the configuration of the present embodiment can be adopted in a connecting structure between the negative electrode tab group 12 and the conductive member 22.

Third Embodiment

Further, in the above embodiments, the upper ends of the positive electrode tab groups 10 and 10a are disposed between the conductive members 20, 20a and the lid 112, respectively, however, the configuration is not limited thereto. For example, a configuration of an electricity storage apparatus 104 shown in FIG. 4 may be adopted. The electricity storage apparatus 104 greatly differs from the electricity storage apparatus 102 of the second embodiment in that an upper end of a positive electrode tab group 110a is not disposed between the conductive member 20a and the lid 112, and the other configurations same as those of the electricity storage apparatus 102 of the second embodiment are adopted. For this reason, same numbers are given to same components as those of the electricity storage apparatus 102, and descriptions thereof may be omitted hereinbelow.

Figure 4:
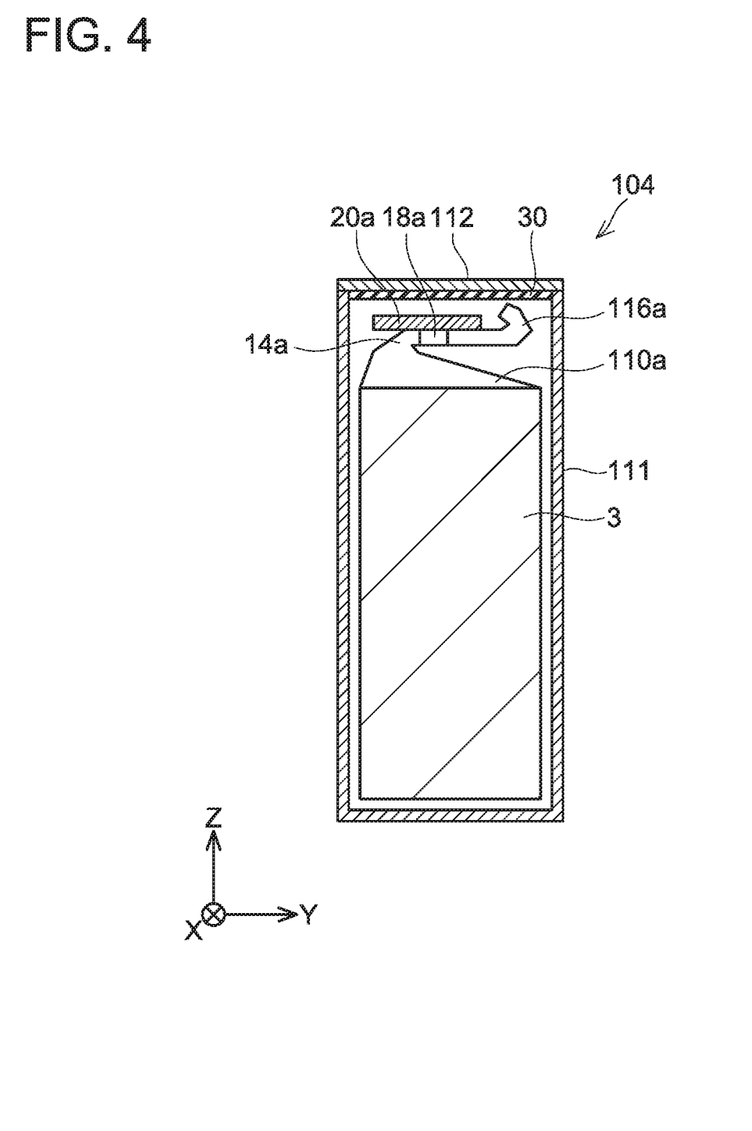
FIG. 4 is a cross sectional view showing a characteristic portion of an electricity storage apparatus according to a third embodiment (the yz cross section).

In the electricity storage apparatus 104, the positive electrode tab group 110a is bent upward at a second bent part 116a. That is, the positive electrode tab group 110a extends along a surface of the conductive member 20a (i.e., the y direction (+side)) in a range from the joining part 18a to the second bent part 116a. The positive electrode tab group 110a extends horizontally, and then at the second bent part 116a, is bent substantially upward, and its upper end extends upward toward the lid 112). Due to this, the upper end of the positive electrode tab group 110a is disposed above the second bent part 116a without being disposed between the conductive member 20a and the lid 112. In the electricity storage apparatus 104 of the present embodiment as well, since the positive electrode tab group 110a is bent upward by the second bent part 116a, the upper end of the positive electrode tab group 110a can be avoided from contacting the electrode assembly 3, and thus a risk of a short-circuit of the electricity storage apparatus 104 can be suppressed. It should be noted that the configuration of the present embodiment as well can be adopted in the connection structure between the negative electrode tab group 12 and the conductive member 22.

Fourth Embodiment

Figure 5:
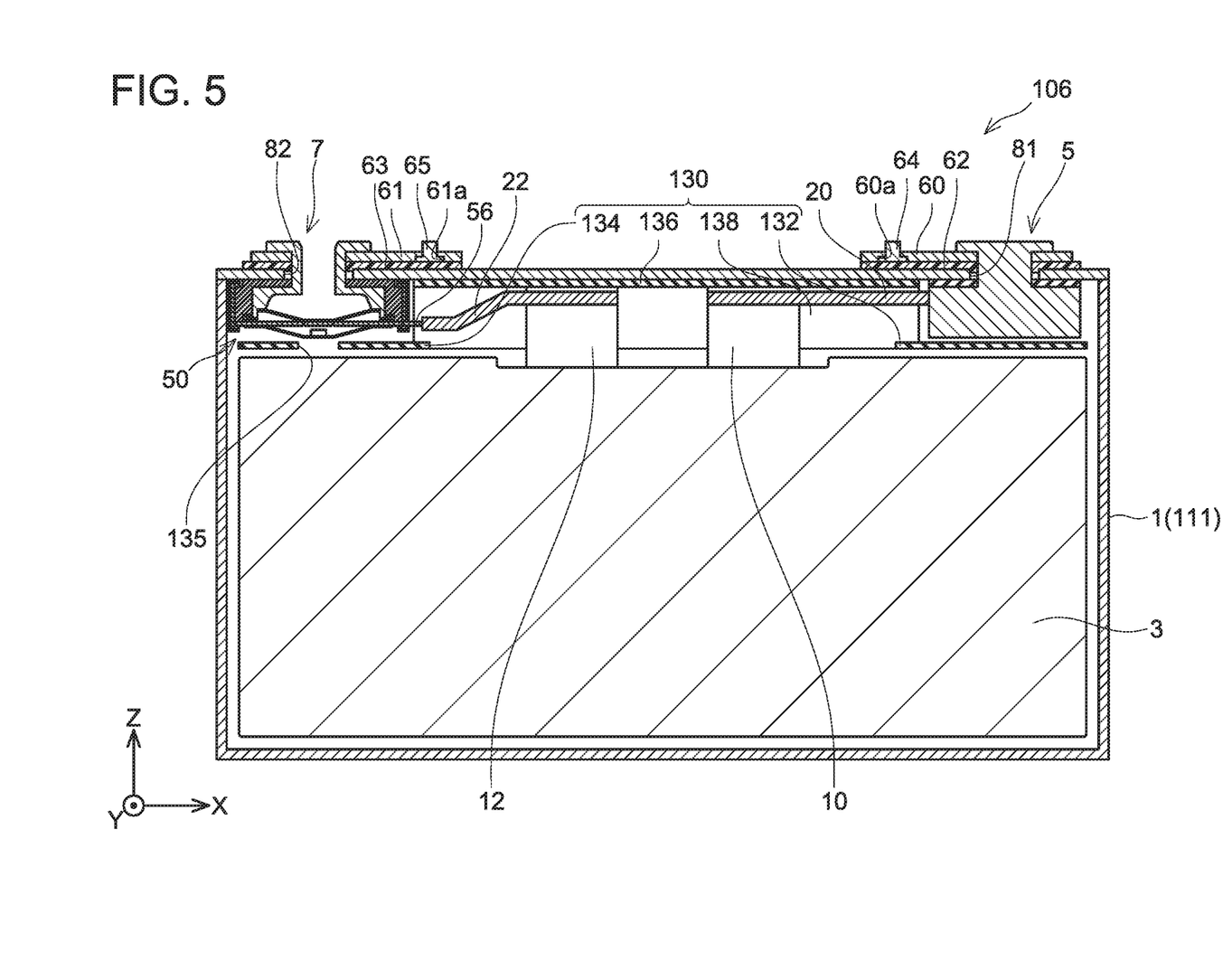
FIG. 5 is a cross sectional view of an electricity storage apparatus according to a fourth embodiment.
Figure 6:
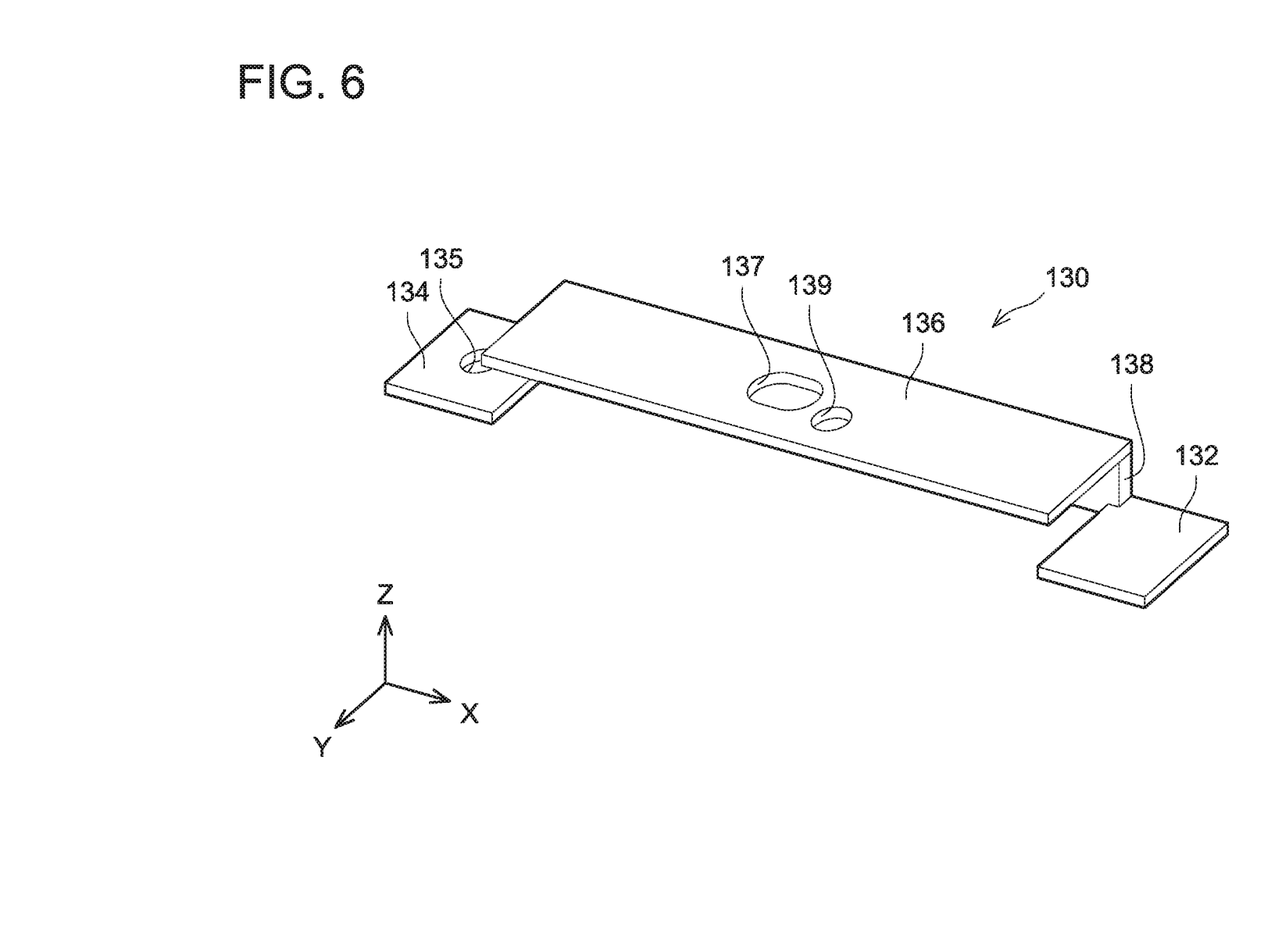
FIG. 6 is a perspective view of an insulating cover provided in the electricity storage apparatus according to the fourth embodiment.

Further, in the above-mentioned first to third embodiments, the insulating member 30 is disposed between the lid 112 and the conductive member 20 or 20a, and the insulating member 32 is disposed between the lid 112 and the conductive member 22. However, the configuration of the electricity storage apparatus of the present teachings is not limited thereto. For example a configuration of an electricity storage apparatus 106 as shown in FIGS. 5, 6 may be adopted. The electricity storage apparatus 106 greatly differs in that it is provided with an insulating cover 130 instead of the insulating members 30, 32. In the following description, same numbers may be given to same components as those of the electricity storage apparatus 100 of the first embodiment, and the description thereof may be omitted.

As shown in FIG. 5, the insulating cover 130 includes a first portion 132 disposed below the connecting terminal 5, a second portion 134 disposed below the connecting terminal 7, a third portion 136 disposed between the first portion 132 and the second portion 134, and a lateral face 138 connecting the first portion 132, the second portion 134, and the third portion 136.

As shown in FIG. 6, each of the first portion 132, the second portion 134, and the third portion 136 is a flat plate having a substantially rectangular shape, and is disposed parallel to an xy plane. Sizes of the first portion 132, the second portion 134, and the third portion 136, in a direction perpendicular (i.e., the y direction) to a longitudinal direction of the conductive members 20, 22 (i.e., the x direction) are substantially same. Each end of the first portion 132, the second portion 134, and the third portion 136 in the y direction is disposed to be matched with each other. A first through hole 135 penetrating in the z direction is provided at a center of the second portion 134. With the first through hole 135 being provided, the current interruption device 50 becomes susceptible to a pressure in the casing 1. That is, the first through hole 135 is provided at a position corresponding to a pressure receiving surface of the current interruption device 50, and the pressure within the casing 1 easily acts on the pressure receiving surface of the current interruption device 50. The third portion 136 is disposed at an upper position than the first portion 132 and the second portion 134, and is disposed between the conductive members 20, 22 and the lid 112 (see FIG. 5). A second through hole 137 and a third through hole 139 which penetrate in the z direction are provided at a center of the third portion 136. The second through hole 137 is disposed at a position corresponding to the safety valve provided on the lid 112. With the second through hole 137 being provided, the pressure in the casing 1 easily acts on the safety valve when the pressure in the casing 1 increases. The third through hole 139 is provided at a position corresponding to the electrolyte injection port provided on the lid 112. By the third through hole 139 being provided, the electrolyte is easily injected into the casing 1.

The lateral face 138 has a substantially rectangular plate shape, and is disposed perpendicular to the first portion 132, the second portion 134, and the third portion 136 (i.e., parallel to the xz plane). The lateral face 138 connects the first portion 132, the second portion 134, and the third portion 136. A size of the lateral face 138 in the longitudinal direction of the conductive members 20, 22 (i.e., an x direction of FIG. 5) is substantially equal to a size of the third portion 136 in the x direction, and the lateral face 138 and the third portion 136 are disposed such that their sides in the x direction are matched with each other in view along the y direction. The lateral face 138 is disposed at a lower portion than the third portion 136, and the lateral face 138 and the third portion 135 are disposed such that their ends in the y direction (−side) am matched with each other. An end of the first portion 132 in the x direction (−side) and an end of the second portion 134 in the x direction (+side) are connected to the lateral face 138. The first portion 132, the second portion 134 and the lateral face 138 are disposed such that ends of the first portion 132 and the second portion 134 in the y direction (−side), and a lower end of the lateral face 138 are matched with each other.

As shown in FIG. 6, the insulating cover 130 comprises the lateral face 138 in the y direction (−side) while it does not comprise a lateral face in the y direction (+side). Due to this, the insulating cover 130 can be mounted to the lid 112, the connecting terminals 5, 7 and the conductive members 20, 22 from the y direction (−side) toward the y direction (+side)). In the present embodiment, the insulating cover 130, the lid 112, the connecting terminals 5, 7 and the conductive members 20, 22 can be easily assembled. That is, the insulating cover 130 is assembled to the lid 112 (specifically, the lid 112 with the connecting terminal 5, the current interruption device 50 and the conductive members 20, 22 being assembled thereto) by being slid from its lateral side in the y direction (+side) such that the third portion 136 of the insulating cover 130 is disposed between the lid 112 and the conductive members 20, 22, the first portion 132 is disposed below the connecting terminal 5, and the second portion 134 is disposed below the current interruption device 50.

The connecting structures between the conductive member 20 and the positive electrode tab groups 10, 10a, 110a described in the above first to third embodiment can be adopted also when the insulating cover 130 is used. That is, the upper ends of the positive electrode tab groups 10, 10a, or 110a are disposed above the second bent parts 16, 16a, 116a respectively by the positive electrode tab groups 10, 10a, 110a being bent upward at the second bent parts 16, 16a, 116a respectively. It should be noted that although in FIG. 5 the positive electrode tab group is denoted by the positive electrode tab group 10, it may be the positive electrode tab group 10a or 110a. Similarly, the above configuration can be adopted in the connecting structure of the negative electrode tab group 12 and the conductive member 22. Due to this, in the present embodiment as well, the upper end of the positive electrode tab group 10 and the upper end of the negative electrode tab group 12 can be avoided from making contact with the electrode assembly 3, and thereby a risk of a short-circuit of the electricity storage apparatus 106 can be suppressed. Further, in the electricity storage apparatus 105 according to the present embodiment, the first portion 132 of the insulating cover 130 is disposed between the connecting terminal 5 and the electrode assembly 3, the second portion 134 of the insulating cover 130 is disposed between the current interruption device 50 and the electrode assembly 3. Due to this, short-circuits between these members can be suppressed from occurring. Further, since the lateral face 138 of the insulating cover 130 is disposed between the ends of the conductive members 20, 22 in the y direction (−side) and a lateral face of the casing 1, a possibility of short-circuits between the conductive members 20, 22, the electrode tab groups 10, 12 and the casing 1 can be reduced.

Fifth Embodiment

Figure 7:
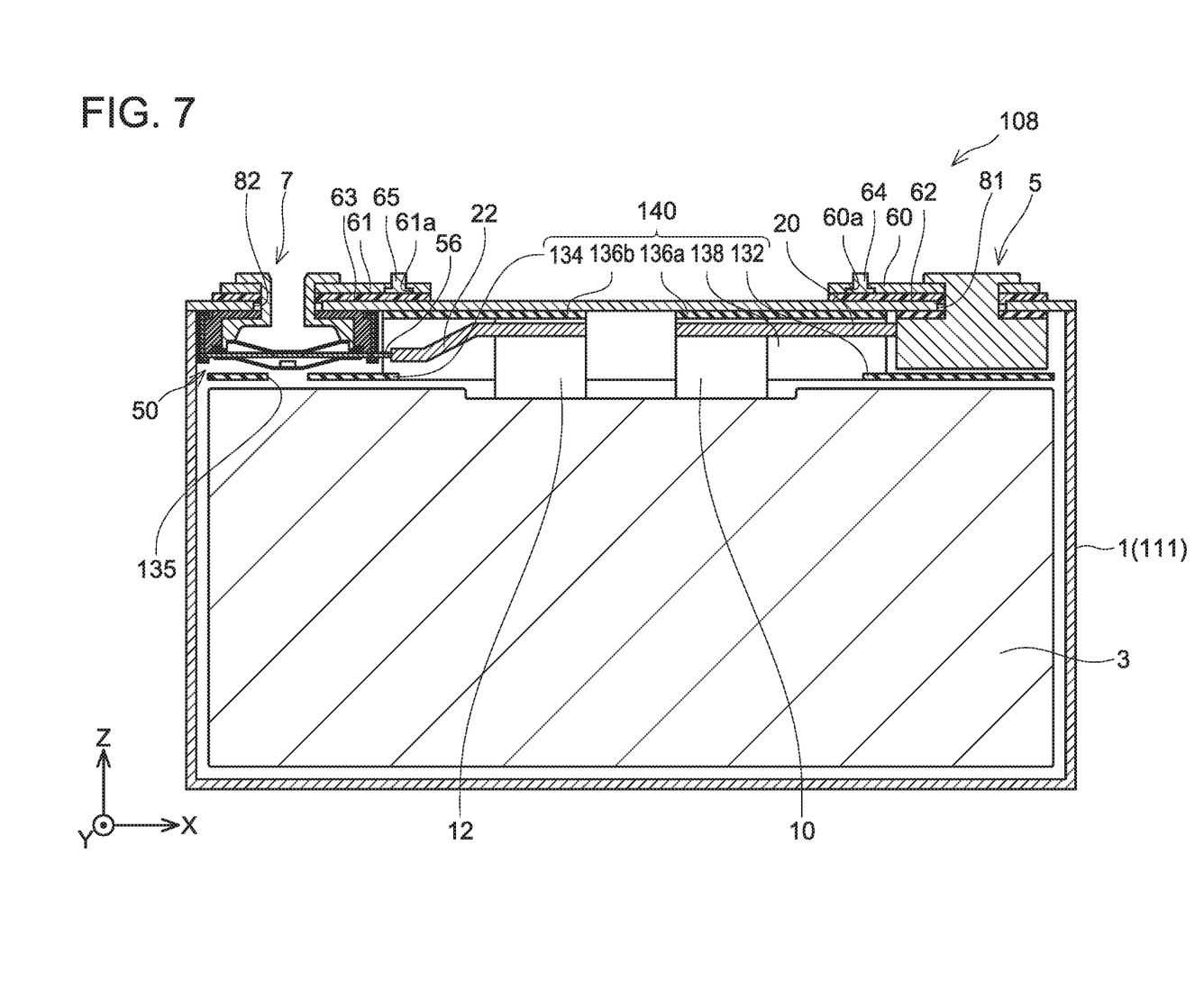
FIG. 7 is a cross sectional view of an electricity storage apparatus according to a fifth embodiment.
Figure 8:
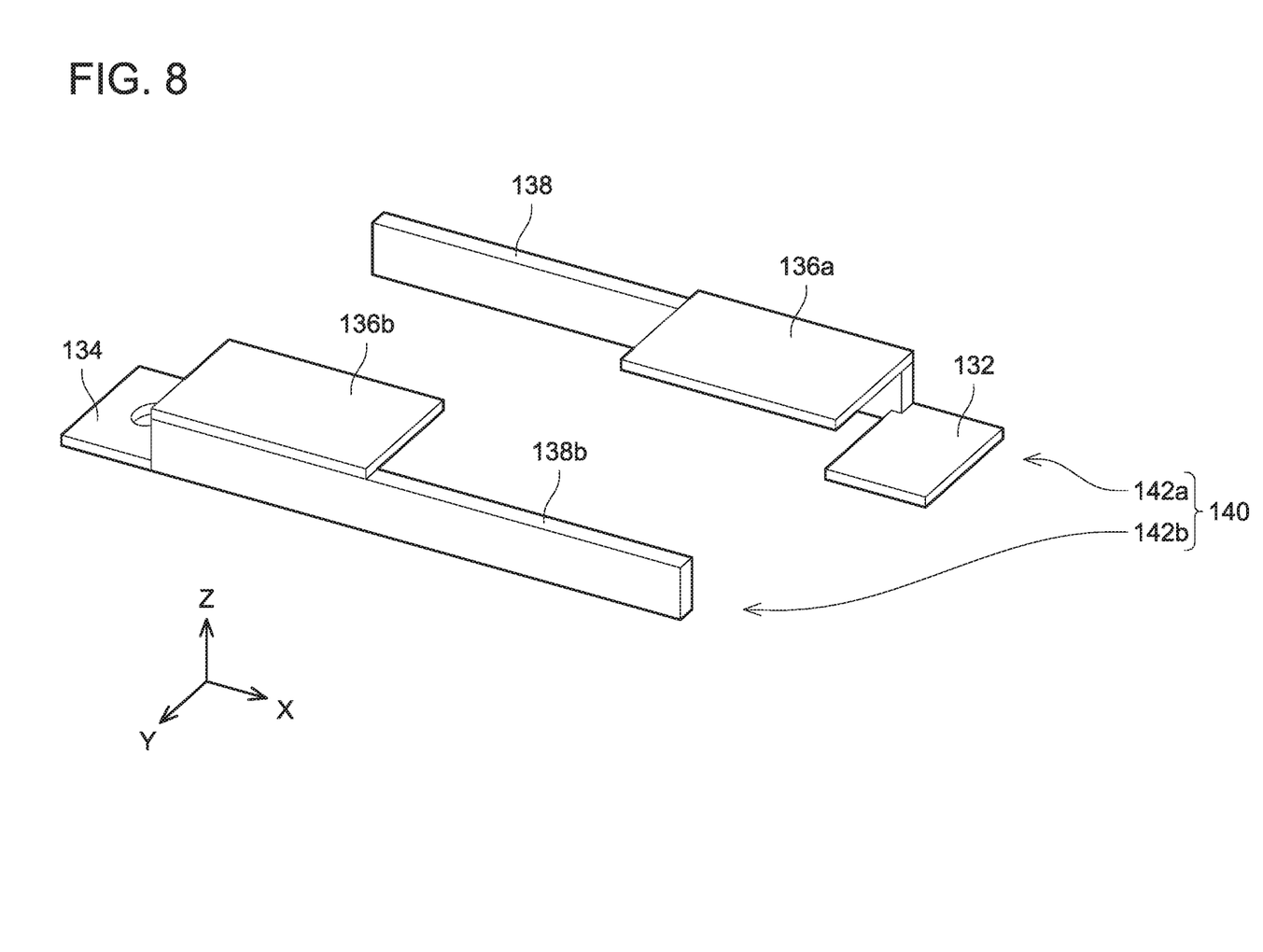
FIG. 8 is an explosive perspective view of an insulating cover provided in the electricity storage apparatus according to the fifth embodiment.

It should be noted that although the insulating cover 130 is used in the above-described fourth embodiment, the configuration is not limited thereto. As shown in FIGS. 7, 8, for example, an insulating cover 140 provided in an electricity storage apparatus 108 may be constituted of two separate components 142a, 142b. It should be noted that same numbers are given to same components as those of the fourth embodiment, and description thereof may be omitted hereinbelow.

As shown in FIG. 6, the insulating cover 140 is constituted of two components 142a and 142b. The component 142a comprises the first portion 132, a fourth portion 136a, and the lateral face 138. The fourth portion 136a is disposed parallel to the first portion 132, and is disposed between the lid 112 and the conductive member 20 (sec FIG. 7). The fourth portion 136a is disposed at an upper end of the lateral face 138 such that an end of the fourth portion 136a in the y direction (−side) is matched with an end of the lateral face 138 in the x direction (+side). A length in the x direction of the fourth portion 136a is made shorter than that of a third portion 136 of the fourth embodiment. Since configurations of the first portion 132 and the lateral the 138 are same as those of the insulating cover 130 of the fourth embodiment, detailed description thereof will be omitted.

The component 142b comprises the second portion 134, a fifth portion 136b and a lateral face 138b. The fifth portion 136b is disposed parallel to the second portion 134, and is disposed between the lid 112 and the conductive member 22 (see FIG. 7). The fifth portion 136b is disposed at an upper end of the lateral face 138b such that ends of the fifth portion 136b are matched with ends of the lateral face 138b in the y direction (+side) and in the x direction (−side). A length of the fifth portion 136b in the x direction is made shorter than that of the third portion 136 of the fourth embodiment. A gap exists between the fourth portion 136a and the fifth portion 136b, and they are not connected when the components 142a, 142b are assembled (see FIG. 7). The gap between the fourth portion 136a and the fifth portion 136b is provided at a position corresponding to the safety valve and the electrolyte injection port provided on the lid 112. The lateral face 138b has a substantially same shape as that of the lateral face 138, and is disposed on a side of the y (+) direction of the insulating cover 140. The lateral face 138b is disposed so as to be matched with the lateral face 138 in a view along the y direction. The lateral face 138b connects the second portion 134 and the fifth portion 136b.

The insulating cover 140 is constituted of the two separate components 142a and 142b. Due to this, the component 142a of the insulating cover 140 can be mounted to the lid 112, the connecting terminal 5 and the conductive member 20 from the y direction (−side) to the y direction (+side). Meanwhile, the component 142b of the insulating cover 140 can be mounted to the lid 112, the connecting terminal 7 and the conductive member 22 from the y direction (+side) to the y direction (−side). In the present embodiment as well, the insulating cover 140, the lid 112, the connecting, terminals 5, 7, and the conductive members 20, 22 can be easily assembled.

The above-described connecting structure between the conductive member 20 and the positive electrode tab groups 10, 10a, 110a can be adopted also when the insulating cover 140 is used, similar to a case where the insulating cover 130 in the fourth embodiment is used. Moreover, same configuration can be adopted in the connecting structure of the negative electrode tab group 12 and the conductive member 22. Due to this, in the present embodiment as well, a contact between the upper ends of the positive electrode tab groups 10, 10a, or 110a, the upper ends of the negative electrode tab groups 12 and the electrode assembly 3 can be avoided, and a risk of a short-circuit of the electricity storage apparatus 108 can be suppressed. Moreover, the insulating cover 140 comprises two lateral faces 138, 138b. Due to this, the insulating cover 140 can avoid the first bent parts 14, 14a and the upper ends of the positive electrode tab groups 10, 10a, 110a from contacting the body of the casing 111. Similarly, the insulating cover 140 can avoid the negative electrode tab group 12 from contacting the body of the casing 111.

The embodiments have been described in detail in the above. However, these are only examples and do not limit the claims. The technology described in the claims includes various modifications and changes of the concrete examples represented above. The technical elements explained in the present description or drawings exert technical utility independently or in combination of some of them, and the combination is not limited to one described in the claims as filed.

What is claimed is:

1. An electricity storage apparatus comprising:
    an electrode assembly including a positive electrode and a negative electrode;
    a tab including one end which is electrically connected to the electrode assembly; a conductive member disposed above the electrode assembly, and electrically connected to the tab;
    a casing housing the electrode assembly; and
    an insulating member disposed between the casing and the tab,
    wherein
    the tab comprises:
        a first bent part provided on a side close to the one end of the tab,
        a second bent part provided on a side close to another end of the tab, and
        a joining part provided between the first bent part and the second bent part, the joining part joined to the conductive member,
    the joining part extends along a surface of the conductive member,
    the second bent part is bent upward from a direction in which the joining part extends,
    the another end of the tab is in contact with the insulating member, and
    wherein the casing comprises a body and a lid covering an upper portion of the body, and the insulating member is fixed to a lower surface of the lid.

2. The electricity storage apparatus according to claim 1, wherein the conductive member is disposed below the joining part of the tab.

3. The electricity storage apparatus according to claim 2, wherein
    the conductive member comprises a curved surface shape part following a surface shape of at least a specific part of the first bent part, and
    the curved surface shape part makes contact with the tab at least in the specific part of the first bent part.

4. The electricity storage apparatus according to claim 3, wherein a corner connecting an upper surface and a lateral surface of the conductive member in the curved surface shape part is processed into a rounded shape, and
    a corner connecting a lower surface and the lateral surface of the conductive member in the curved surface shape part is processed into a rounded shape.

5. The electricity storage apparatus according to claim 1, wherein in the first bent part, the tab is bent parallel to a plane where the one end of the tab is connected to the electrode assembly, and the tab does not extend in a direction perpendicular to the plane where the one end of the tab is connected to the electrode assembly.

6. The electricity storage apparatus according to claim 1, wherein in the first bent part, the tab is bent parallel to a plane where the one end of the tab is connected to the electrode assembly, and a part of the tab extending in a direction perpendicular to the plane where the one end of the tab is connected to the electrode assembly does not exist.

7. The electricity storage apparatus according to claim 1, wherein
    in view of the conductive member from a direction perpendicular to a plane where the one end of the tab is connected to the electrode assembly, the conductive member comprises a part overlapping with the tab, and
    the part overlapping with the tab is flat.

8. The electricity storage apparatus according to claim 1, wherein
    in view of the conductive member from a direction perpendicular to a plane where the one end of the tab is connected to the electrode assembly, the conductive member comprises a part overlapping with the tab, and an entirety of the part overlapping with the tab is disposed below the joining part.

* * * * *